Patented Aug. 7, 1928.

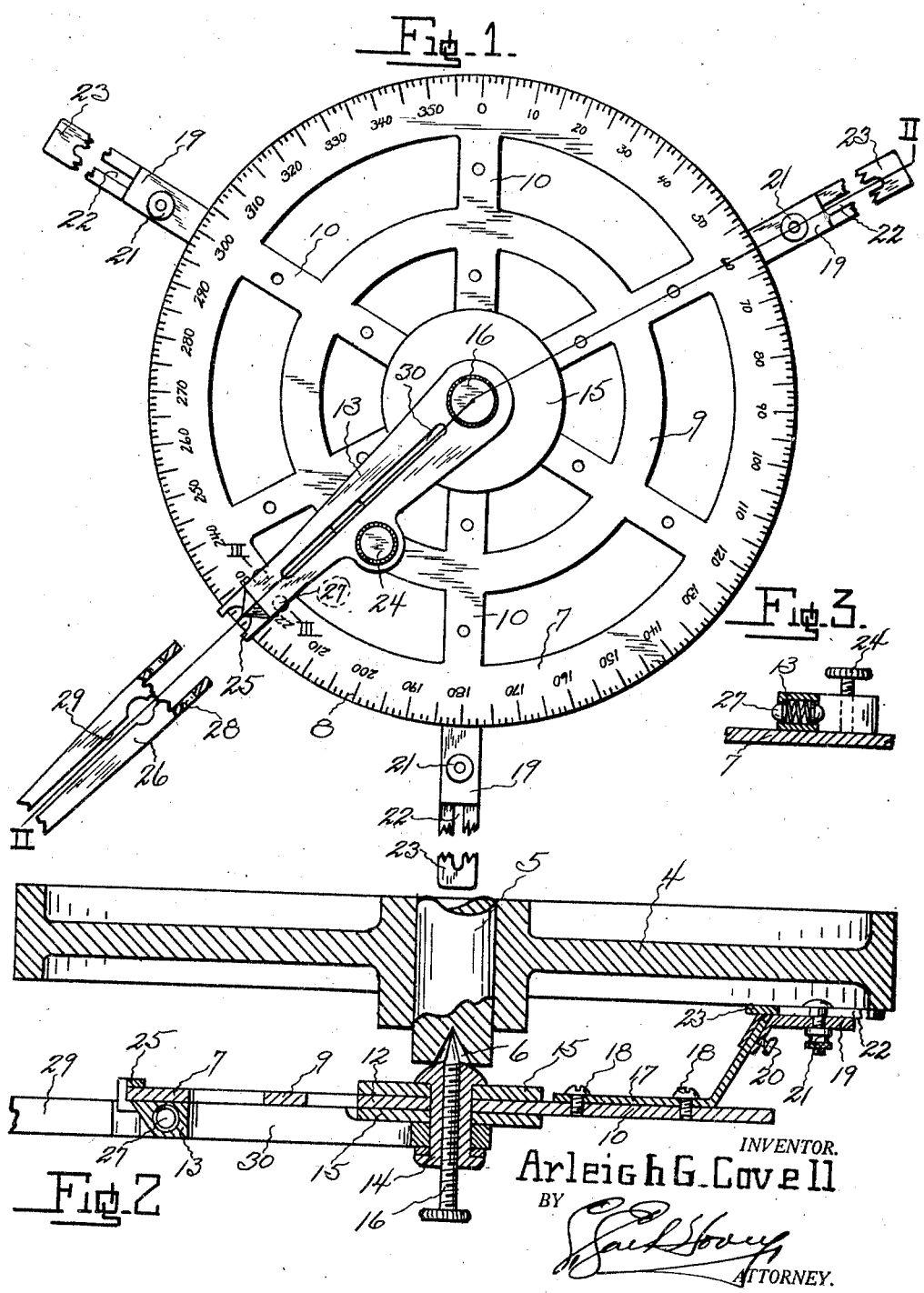

1,679,931

UNITED STATES PATENT OFFICE.

ARLEIGH G. COVELL, OF CORUNNA, MICHIGAN.

DEGREE COMPASS.

Application filed March 15, 1926. Serial No. 94,862.

This invention relates to precision instruments of the type known as a protractor or degree compass, and the primary object of this invention is to provide a device of this character which may be used with work of varying sizes and diameters.

One of the primary objects of my invention is to provide a degree compass which has an extensible pointer, pivotally mounted at the center of a disk which is provided with means for securing the same in any predetermined position.

Another object of the instant invention is to provide a novelly constructed mounting for the pivotally mounted pointer which serves to maintain the pointer in a proper working position and which also cooperates with its centering pin to maintain the compass in the centered location.

An even further object of the present invention is the provision of a degree compass which is equipped with adjustable brackets for attaching the same to work having a larger diameter than the degree disk thereof and which are also adapted to move the disk toward and away from the work.

Many minor objects of the invention and refinements of construction will appear during the course of the detailed specification referring to the accompanying drawing, in which:

Figure 1 is a face view of a degree compass constructed in accordance with my invention.

Fig. 2 is a cross section through the same taken along line II—II of Fig. 1, and, Fig. 3 is an enlarged detailed view of the pointer extension affixing means, taken on line III—III of Fig. 1.

In the drawing, where similar reference numerals refer to like parts throughout the several views, the numeral 4 designates an ordinary gear blank mounted on a shaft 5 which has the usual centering socket 6 in the end thereof.

As is well known, it is desirable to use a degree compass of this character to set off necessary markings around the outer periphery of gear blanks such as shown at 4, and it is not the unusual thing for such work to be extremely difficult in view of the lack of an instrument such as set forth herein.

This degree compass preferably consists of a scale disk 7, around the outer periphery of which are set off the degree markings 8. This disk is cut away as shown in Fig. 1 to provide an inner track 9, supported by a series of radially extending spokes 10, which terminate in the center to form a supporting portion 12 for a pointer 13.

Pointer 13 extends radially of disk 7 and is pivotally supported as shown in Fig. 2 by a tapped rivet 14 which also secures two washers 15 in place on either side of portion 12. The work-facing head of rivet 14 is dome-shaped to aid in centering the compass when necessary, and a centering pin 16 is screwthreaded through the tapped opening of rivet 14. This pin 16 may be of any length, and enters a socket 6 of any depth when the device is in use, simply by turning the head of the pin to cause the desired adjustment.

To apply the degree compass to work of varying sizes, the disk 7 is provided with a plurality of brackets, in this instance shown to be three, which are adapted to be extended in any suitable manner and to raise and lower the compass from and toward the work.

One form of embodiment of this part of the invention is shown to be an angled member 17 rigidly secured to one of the spokes 10 by screws or analogous means 18. The outermost end of member 17 is slidably fitted into the angled portion of an extension element 19 which carries a set screw or the like 20 for holding member 17 in the proper position with respect to the distance away from gear blank 4.

Element 19 supports a set screw 21 which passes through a longitudinal slot 22 formed in the work engaging arm 23. This arm 23, therefore, is movable radially, and may extend for any distance to suit the size of the work.

Pivotally mounted pointer 13 carries a set screw or the like 24 which is located directly over and engages track 9 when it is desired to secure the pointer in place. To cooperate with this set screw 24, a rebent lug 25 integral with pointer 13 engages the outer and under side of disk 7 in a manner shown in Fig. 2. When set screw 24 is tightened, pointer 13 cannot be lifted from markings 8 to render the instrument inaccurate.

An extension arm 26 for pointer 13 is provided which is removably snapped into place through the use of the well-known ball and detent construction 27 and 28 respectively. This extension is used when the diameter of the work is greater than that of disk 7, and degree marks may be scratched on the work by inserting any instrument through slot 29 of the extension 26 or slot 30 of pointer 13. These slots are in radial alinement when the extension is affixed, and may also be used for sights when desired.

The operation and application of the degree compass has been made clear throughout the specification.

What I claim and desire to secure by Letters Patent is:

1. A degree compass comprising a scale disk having degree markings on the face thereof around the outer periphery, a pointer pivotally supported at the center of said disk, a tapped rivet, said pointer being supported for rotation by said tapped rivet, an adjustable centering pin in said tapped rivet, the head of said rivet adjacent the work engaging end of said pin being dome-shaped to cooperate therewith in centering said scale disk in the operative position.

2. A degree compass comprising a scale disk having degree markings on the face thereof around its outer periphery, a pointer pivotally supported at the center of said disk a circular track, a rebent lug formed by said pointer engaging the outer edge and under side of said disk and a set screw carried by said pointer intermediate said lug and the center of said disk, said set screw adapted to engage said circular track and cooperate with said rebent lug to secure the pointer in any predetermined position.

3. In a degree compass, a scale disk, a pointer pivotally supported at the center thereof, and a plurality of brackets carried by said disk whereby the same is mounted on work of varying sizes, said brackets being extensible radially of said disk and adapted to be adjusted to move the disk toward and from the work.

In testimony whereof I hereunto affix my signature.

ARLEIGH G. COVELL.